United States Patent [19]

Hulse et al.

[11] Patent Number: 5,581,841
[45] Date of Patent: Dec. 10, 1996

[54] BRUSHING OR CLEANING APPARATUS

[75] Inventors: David K. Hulse; William C. Barnett, both of Stoke-on-Trent, England

[73] Assignee: Royal Doulton (UK) Limited, Stoke-on-Trent, England

[21] Appl. No.: 408,815

[22] Filed: Mar. 22, 1995

[30] Foreign Application Priority Data

Mar. 24, 1994 [GB] United Kingdom ............... 9405821

[51] Int. Cl.$^6$ ................................................ A47L 15/39
[52] U.S. Cl. .................... 15/309.2; 15/74; 15/77; 15/88.3; 15/311
[58] Field of Search ............... 15/74, 88.2, 88.3, 15/77, 97.1, 102, 21.1, 88.4, 101, 309.2, 310, 311; 134/6

[56] References Cited

U.S. PATENT DOCUMENTS

| | | | |
|---|---|---|---|
| 949,381 | 2/1910 | Polk .................................... | 15/88.2 |
| 2,213,426 | 9/1940 | Anderson et al. ..................... | 15/74 |
| 3,261,286 | 7/1966 | Hunter et al. ......................... | 15/88.3 |
| 3,939,514 | 2/1976 | Cook ..................................... | 15/88.2 |
| 4,024,596 | 5/1977 | Rioux ................................... | 15/88.3 |
| 4,208,760 | 6/1980 | Dexter et al. ......................... | 15/302 |

FOREIGN PATENT DOCUMENTS

| | | |
|---|---|---|
| 517033 | 5/1992 | European Pat. Off. . |
| 364242 | 11/1930 | United Kingdom . |
| 682559 | 9/1950 | United Kingdom . |

*Primary Examiner*—Mark Spisich
*Attorney, Agent, or Firm*—Watts, Hoffmann, Fisher & Heinke Co., L.P.A.

[57] ABSTRACT

Apparatus for removing particulate material from the surface of an article of flat or hollow ware comprises spaced endless belt members adapted to engage the opposite edges of the article, mechanism for driving the belt members at the same peripheral speed alternately in the same direction and in opposite directions whereby to deliver the article to a brushing position and rotate the article in the brushing position, and mechanism for brushing the opposite surfaces of the article during rotation of the article in the brushing position.

10 Claims, 4 Drawing Sheets

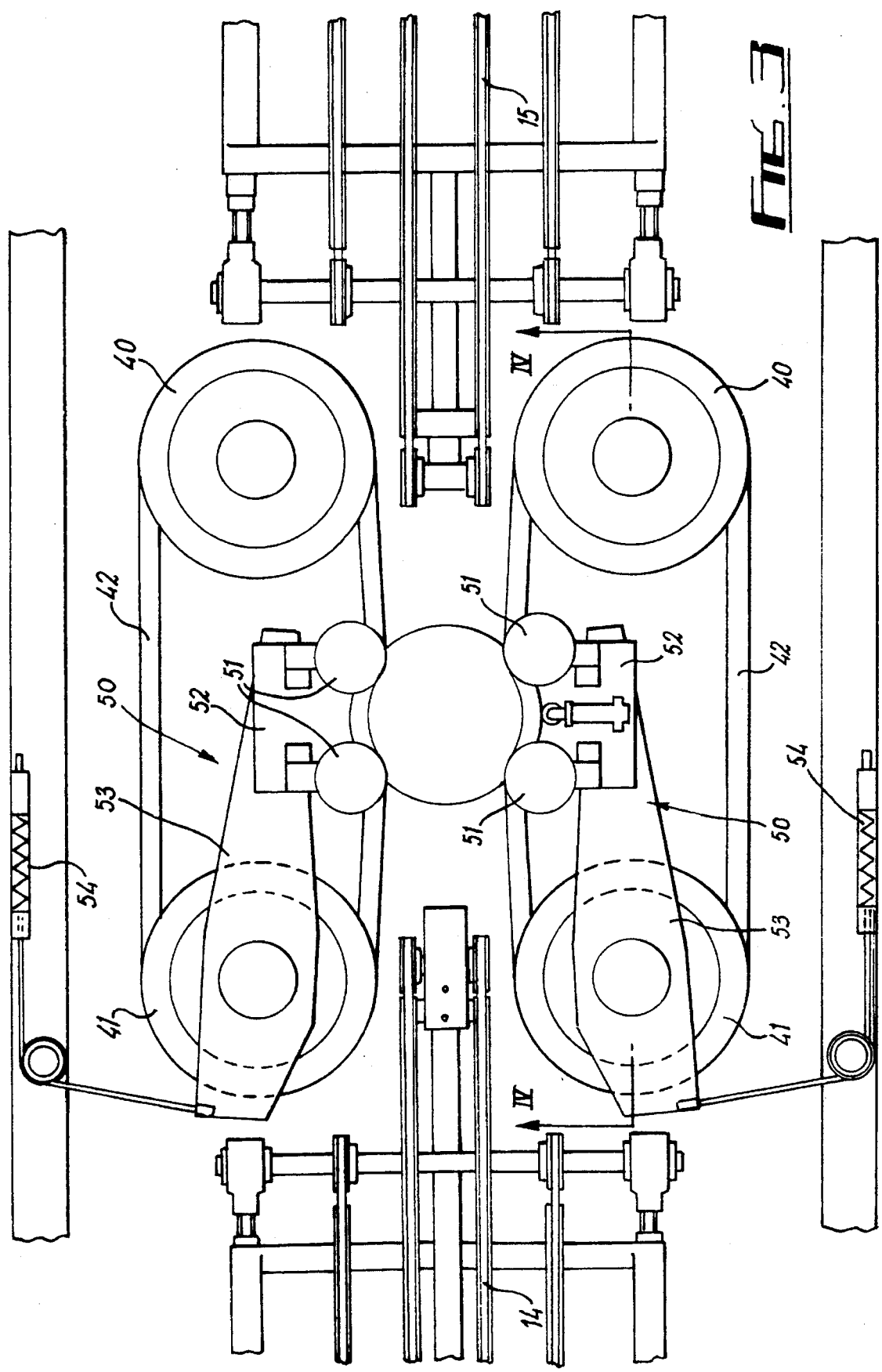

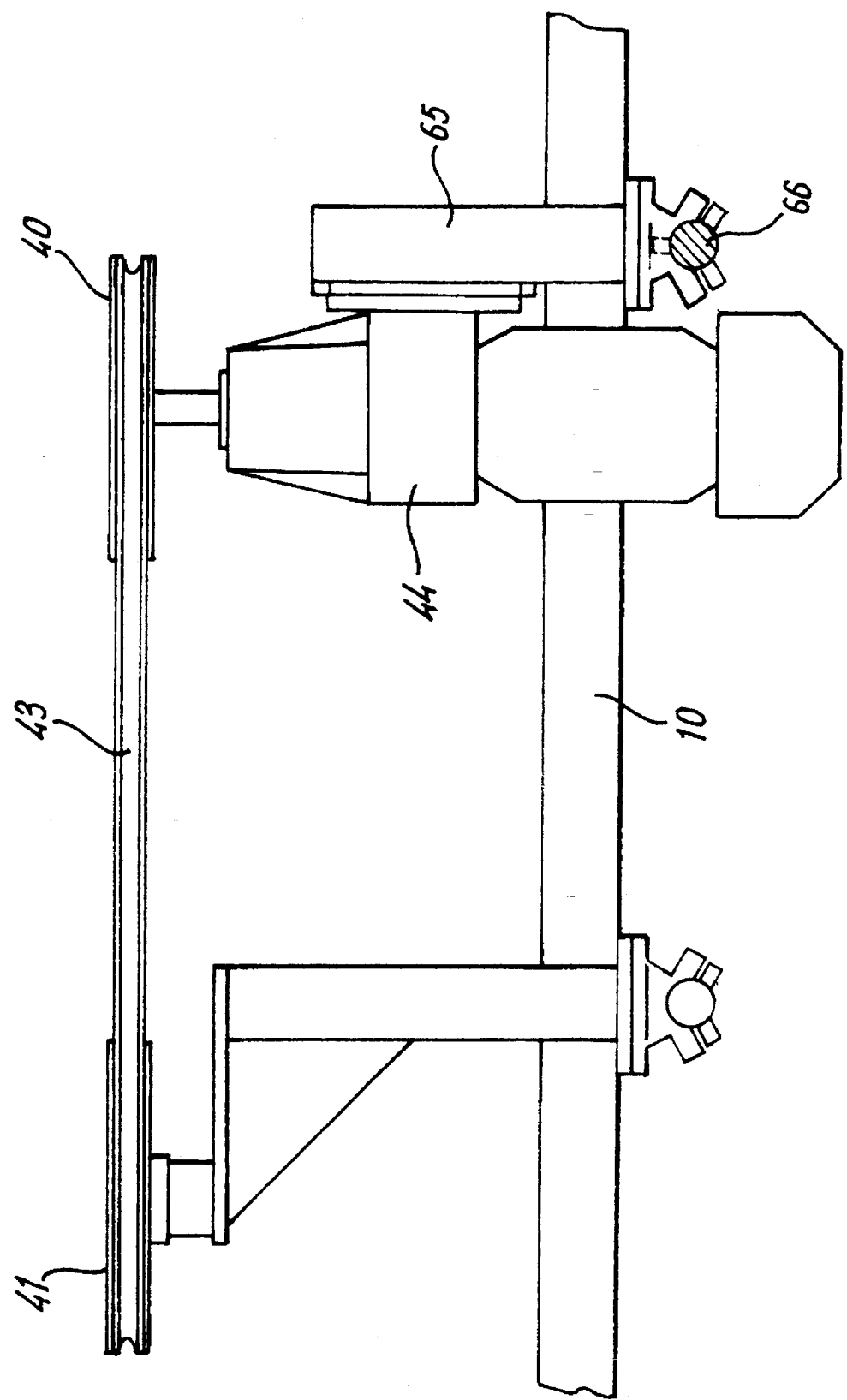

BRUSHING OR CLEANING APPARATUS

This invention relates to apparatus for brushing or cleaning articles of ware especially, but not exclusively, articles of ceramic ware.

Articles of ceramic ware fired to the "biscuit" state prior to glazing require to be carefully cleaned to remove loose ceramic or other dust particles from their surfaces prior to glazing. It is an object of the present invention to provide apparatus for this purpose or for brushing or cleaning of other articles from which dust or other contaminant particles require to be removed.

The invention provides apparatus for removing particulate material from the surface of an article of flat or hollow ware comprising spaced endless belt members adapted to engage the opposite edges of the article, means for driving said belt members at the same peripheral speed alternately in the same direction and in opposite directions, whereby to deliver the article to a brushing position and rotate the article in the brushing position, and means for brushing the opposite surfaces of the article during rotation of the article in the brushing position.

Preferably said belt members incorporate longitudinally-extending grooves adapted to engage and support the edges of said article. The belt members are preferably disposed side-by-side in a generally horizontal plane whereby the article is transported through the apparatus in a generally horizontal position.

Preferably said belt members extend beyond said brushing position whereby on driving of said belt members in the same direction, a brushed article is discharged from the brushing position simultaneously with delivery of a further article into the brushing position.

Said means for brushing the article preferably comprises upper and lower rotatable brush members and means for moving said brush members into contact with the opposite surfaces of the article while the article is in said brushing position.

Preferably also the apparatus includes tensioning members operative to urge said belt members into and to retain same in engagement with the edges of said article during rotation and brushing thereof.

Means is preferably provided to vary the distance between said belt members whereby to adapt the apparatus to accommodate articles of different size.

An embodiment of the invention will now be described, by way of example only, with reference to the accompanying diagrammatic drawings, in which:

FIG. 3 is a fragmentary plan view showing means for rotating the articles during cleaning; and FIG. 4 is a section on the line IV—IV in FIG. 3 with parts omitted for clarity.

Figure 1:
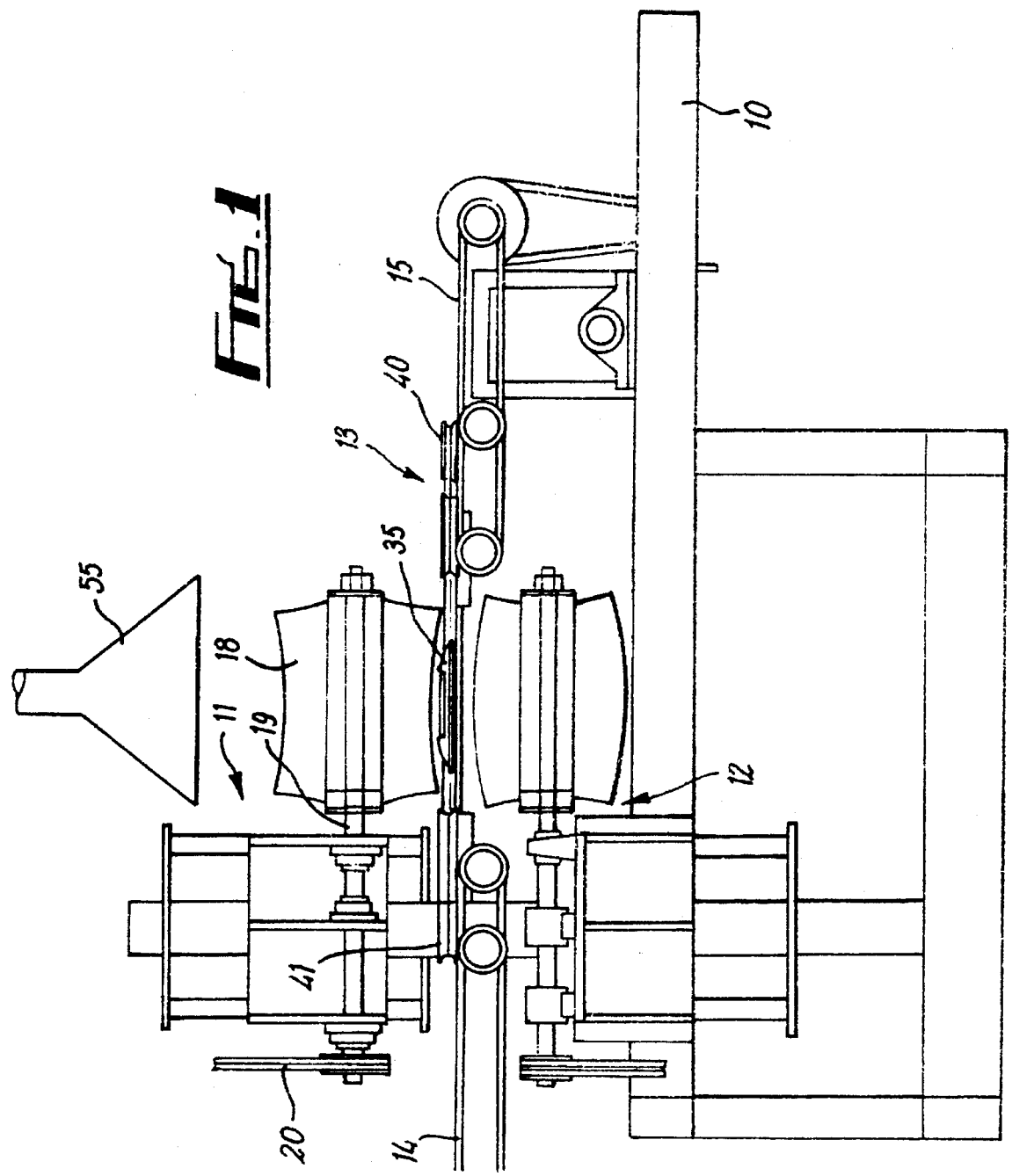
FIG. 1 is a vertical cross-section through one form of apparatus suitable for the brushing or cleaning of articles of ceramic ware.

Referring to the drawings, the apparatus forms part of a production line serving to deliver plates, saucers or similar articles of ceramic flatware or holloware to a glazing unit (not shown). The apparatus serves to remove dust, ceramic or other loose contaminant particles from the surfaces of the articles prior to glazing.

Figure 2:
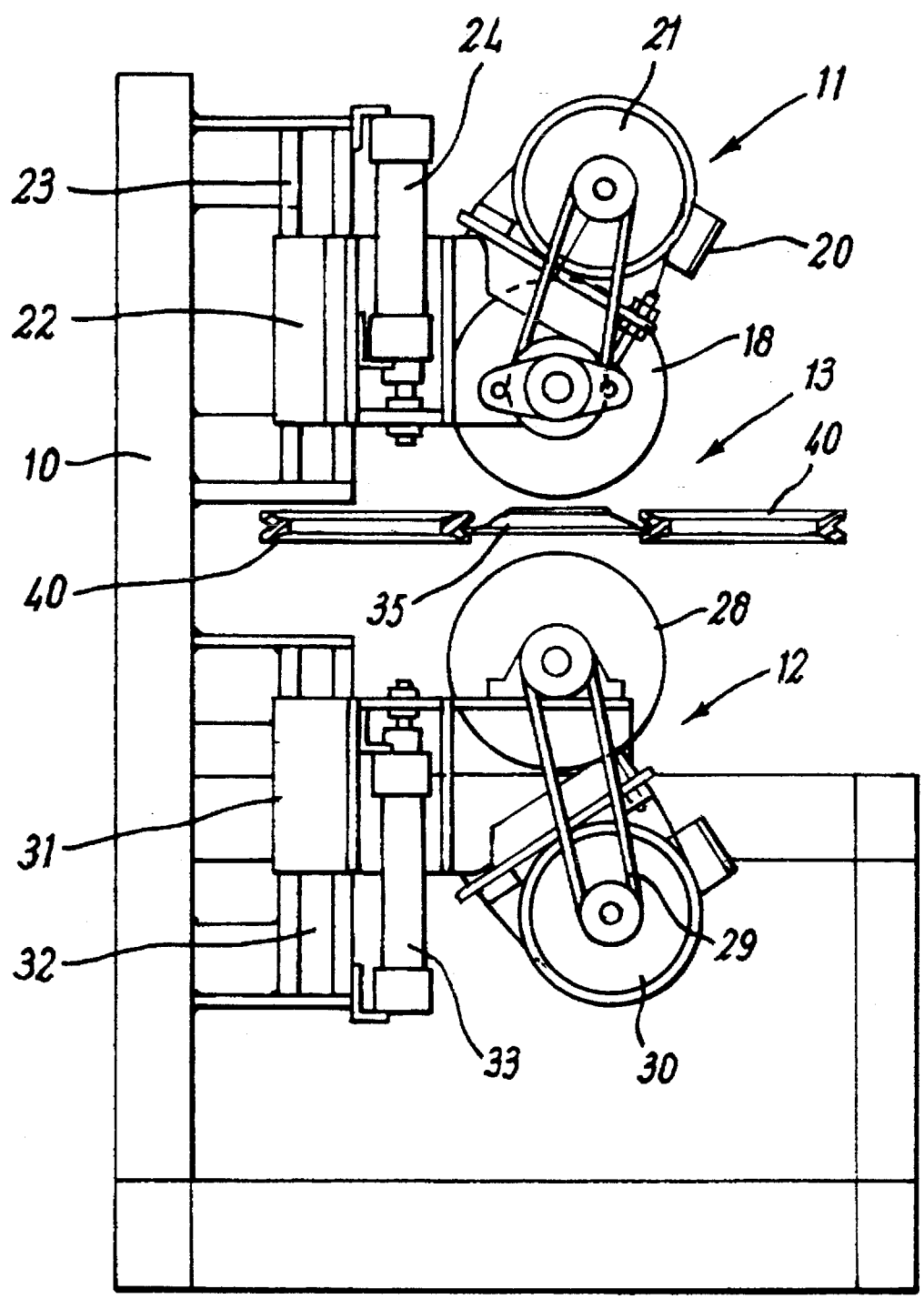
FIG. 2 is an end view of the apparatus shown in FIG. 1.

As seen in FIGS. 1 and 2 of the drawings, the apparatus comprises a main frame 10 on which are mounted upper and lower brushing units 11 and 12. Between and to each side of the brushing units plate-supporting and rotating units 13 are located. Plates to be cleaned are delivered to the units on an inlet conveyor 14 and are discharged from the units on an outlet conveyor 15.

Referring to FIGS. 1 and 2, the upper brushing unit 11 comprises a brush 18 mounted on a shaft 19 rotatable via a drive belt 20 from a motor 21 (not shown in FIG. 1.). The unit is mounted on a mounting bracket 22 slidably supported on a shaft 23 for vertical movement relative to the frame 10 by an air cylinder 24. The lower brush unit 12 comprises a brush 28 adapted to be rotated through a drive belt 29 from a motor 30. The unit is mounted on a bracket 31 slidable on a shaft 32 relative to the frame 10 by means of an air cylinder 33. The air cylinders 24 and 33 are arranged to be operated so as to move the brushes 18 and 28 towards one another into contact with the upper and lower surfaces of a plate 35 and thereafter to move apart to allow the plate to be transported forwardly for further processing.

Plates are delivered to the apparatus on the inlet conveyor 14 and discharged on to the outlet conveyor 15. In the zone between these conveyors the plates are supported and rotated by the supporting and rotating units 13. As best seen in FIG. 3, each unit 13 comprises a belt drive mechanism incorporating a driving pulley 40 and an idler pulley 41 around which is entrained a drive belt 42. the belt 42 engages grooves in the pulleys 40 and 41 and is provided with a longitudinally extending groove or recess 43 (FIG. 4) in its outwardly directed surface. Each drive pulley 40 is adapted to be rotated by a drive motor 44 at least one of which is reversible.

Tensioning units 50 are associated with each unit 13 and each comprise a pair of idler pulley 51 rotatably mounted about vertical axes and carried by a bracket 52 mounted on a support arm 53 pivotally movable about the axis of the associated idler pulley 41. The arms 53 are acted on by spring means 54 operable, in the case of the lower unit as viewed in FIG. 3, to urge the lever in an anti-clockwise direction to move the tensioning unit 50 into engagement with the inner surface of the belt 42, and in the case of the upper unit as viewed in FIG. 3, to urge the arm 53 in a clockwise direction about the axis of the pulley 41 to bias the tensioning unit 50 into contact with the inner surface of the associated belt 42. In this way the adjacent runs of the belt 42 are urged towards one another during operation of the apparatus.

The plate supporting and rotating units 13 are arranged to be alternately driven in the same and opposite directions. Thus as plates are delivered to the units from the conveyor 14, the respective drive motors 44 are driven in opposite directions whereby the adjacent runs of the belts 42 move in the same direction. The edges of the plates delivered from conveyor 14 engage in the grooves 43 in the belts and the plates are thus transported to a central brushing position adopted by the plate 35 in the drawings.

When the plate reaches the brushing position, the drive motors 44 are momentarily stopped and one motor is then reversed. When the motors are re-started the adjacent runs of the belts 42 move in opposite directions thereby rotating the plate while continuing to support it by engagement of its edges in the grooves 43. The brushing units 11 and 12 are then brought into engagement with the upper and lower surfaces of the plate as will be described hereafter. Following brushing the drive motors 44 are again momentarily stopped and one motor reversed so that on re-starting the adjacent runs of the belts 42 move in the same direction and propel the plate out of the apparatus on to the conveyor 15 on which it is transported to the glazing unit (not shown). In the meantime a further plate has been delivered to the brushing unit for brushing/cleaning.

Thus in operation of the apparatus, plates to be cleaned are delivered on conveyor 14, picked up by their edges by the inner runs of the drive belts 42 and moved to the brushing position. The belts 42 are then driven in opposite directions to rotate the plate, and the air cylinders 24 and 33 are actuated to move the brushing units 11 and 12 towards one another while the brushes rotate. The upper and lower surfaces of the plate are thus brushed while the plate is rotated. The brushing units are then moved apart by reversing the operation of the cylinders 24 and 33, the drive belts 42 are momentarily stopped and one reversed, following which the drive belts are re-started and the plate is propelled out of the apparatus on to the conveyor 15. During the brushing operation dust and other contaminant particles removed from the plate are extracted from the apparatus by vacuum extraction through an extractor hood 55.

By virtue of the arrangement described loose particulate material is removed simultaneously from the upper and lower surfaces of the plate in a rapid and efficient manner, thereby leaving the plate free from dust or other contaminant particles which would produce flaws in the glazed article. The apparatus enables a high throughput of articles to be cleaned and reduces the likelihood of breakages as the articles do not require to be handled by operatives at any stage of the brushing or cleaning process.

A particular advantage of the apparatus described is its ability to handle articles of a wide range of sizes. As best seen in FIG. 4, the drive motors 44 are mounted on supports 65 slidably movable along shafts 66 by rotation of a hand wheel (not shown). This moves the plate-supporting and rotating units 13 towards or away from one another to increase the distance between the adjacent runs of the drive belts 42 and thus enables the machine to be readily adapted to accommodate plates or other flatware or holloware articles of different diameter.

Various modifications may be made without departing from the invention. For example, while in the arrangement described the brushes are continuously rotated, they could be arranged to be brought into rotation when moved towards one another and stopped when moved apart. Moreover while it is preferred that brushing of both surfaces of the plates is effected simultaneously, they could be brushed in sequence if desired.

It will be noted that the peripheral surfaces of the brushes in the arrangement described are shaped to correspond to the plate or other article being cleaned. This is not however necessary and where shaped brushes are employed it is generally not necessary to substitute brushes of different shape to suit different articles although this could be done if desired.

It should be also noted that while reference has been made herein to the removal of dust, ceramic or other contaminant particles from ceramic articles, the invention is equally applicable to the removal of dust or other particles from articles made of other materials such as plastics or metal prior to subsequent treatment.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. Apparatus for removing particulate material from the surface of an article comprising brushing means operable to brush opposite surfaces of the article, spaced endless belt members adapted to engage and support opposite edges of the article, and drive means for driving said belt members at the same peripheral speed, said drive means being operable:
   a) to first drive adjacent runs of said belt members in the same direction to deliver such article to a brushing position;
   b) to subsequently drive said adjacent runs in opposite directions to rotate such article in the brushing position without effecting linear movement of such article relative to said brushing means; and,
   c) thereafter to again drive said adjacent runs in the same direction to discharge such brushed article from the apparatus.

2. Apparatus according to claim 1 wherein said belt members incorporate longitudinally-extending grooves adapted to engage the edges of and support said article.

3. Apparatus according to claim 2 wherein said belt members are disposed side-by-side in a generally horizontal plane whereby the article is transported through the apparatus in a generally horizontal position.

4. Apparatus according to claim 1 wherein said means for brushing the article comprises upper and lower rotatable brush members and means for moving said brush members into contact with the opposite surfaces of the article while the article is in said brushing position.

5. Apparatus according to claim 4 wherein said means for moving said brush members is arranged to move them into contact with the opposite surfaces of the article simultaneously.

6. Apparatus according to claim 5 wherein each of said brush members is drivingly connected to a drive motor movable with the respective brush member relative to the article to be brushed.

7. Apparatus according to claim 1 including tensioning means operative to urge said belt members into and to retain same in engagement with the edges of said article during rotation and brushing thereof.

8. Apparatus according to claim 1 including means to vary the distance between said belt members whereby to adapt the apparatus to accommodate articles of different size.

9. Apparatus according to claim 1 including means for removing contaminant particles from the apparatus.

10. Apparatus according to claim 1 wherein said belt members are arranged such that when the adjacent runs are driven in the same direction, the belt members are operable to simultaneously discharge a brushed article from the brushing position and deliver a further article into the brushing position.

* * * * *